(12) United States Patent
Jang et al.

(10) Patent No.: US 9,835,824 B2
(45) Date of Patent: Dec. 5, 2017

(54) CAMERA LENS SYSTEM

(71) Applicants: Issac Jang, Shenzhen (CN); Jay Park, Shenzhen (CN)

(72) Inventors: Issac Jang, Shenzhen (CN); Jay Park, Shenzhen (CN)

(73) Assignee: AAC ACOUSTIC TECHNOLOGIES (SHENZHEN)CO., LTD, Shenzhen (CN)

( * ) Notice: Subject to any disclaimer, the term of this patent is extended or adjusted under 35 U.S.C. 154(b) by 67 days.

(21) Appl. No.: 15/011,485

(22) Filed: Jan. 30, 2016

(65) Prior Publication Data

US 2016/0266355 A1    Sep. 15, 2016

(30) Foreign Application Priority Data

Mar. 11, 2015    (KR) .......................... 10-2015-0033974

(51) Int. Cl.
| | |
|---|---|
| *G02B 13/00* | (2006.01) |
| *G02B 9/60* | (2006.01) |
| *G02B 27/00* | (2006.01) |
| *G02B 3/04* | (2006.01) |

(52) U.S. Cl.
CPC ........... *G02B 13/0045* (2013.01); *G02B 3/04* (2013.01); *G02B 9/60* (2013.01); *G02B 27/0025* (2013.01)

(58) Field of Classification Search
CPC ...... G02B 9/60; G02B 13/0045; G02B 13/18; G02B 3/04
USPC ......................................... 359/714, 757, 713
See application file for complete search history.

(56) References Cited

U.S. PATENT DOCUMENTS

| | | | | |
|---|---|---|---|---|
| 3,586,418 A | * | 6/1971 | Abe ...................... | G02B 25/001 359/644 |
| 2014/0111872 A1 | * | 4/2014 | Tang ................... | G02B 13/0045 359/713 |

* cited by examiner

*Primary Examiner* — Ricky Mack
*Assistant Examiner* — Kristina Deherrera
(74) *Attorney, Agent, or Firm* — Na Xu; IPro, PLLC

(57) ABSTRACT

A camera lens system is disclosed. The camera lens system includes five lens groups lined up from the object side. The lens groups includes a first lens group having a first lens having a positive refractive power; a second lens group having a second lens having a negative refractive power; a third lens group having a third lens having a positive refractive power and the a fourth lens having a negative refractive power; a fourth lens group having a fifth lens having a convex image side surface and a positive refractive power; a fifth lens group having a sixth lens having a concave image side surface and a negative refractive power. An image side surface of the third lens is connected to an object side surface of the fourth lens.

5 Claims, 3 Drawing Sheets

CAMERA LENS SYSTEM

FIELD OF THE INVENTION

The present invention relates to a camera lens system which can be used in smart phones, digital cameras and other portable terminal devices, monitors and PC camera lens for video recording or image capturing.

DESCRIPTION OF RELATED ART

The smart phones or portable devices in recent years emphasize more on their portability. With the continuous development of the display, the demand on the small size, high resolution camera lens of the smart phones or portable devices, monitor lens, PC camera lens and digital cameras etc. is growing. A camera lens system including 4 lenses is used usually to correct astigmatism for higher performance of the lens system in recent time. In other words, for the lens used in low-pixel camera module, the demand on the image resolution is not high due to larger pixel size, three or less lens groups can be used. For the lens with high resolution demand due to the small pixel size and high demand on the image, 3 to 4 lens groups are used.

However, with the continuous development of technology, the pixel requirement is higher on camera's CCD and CMOS material, therefore, the camera lens system with better image quality and better performance is required.

Therefore, it is necessary to provide a new camera lens system to solve the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

Figure 1:
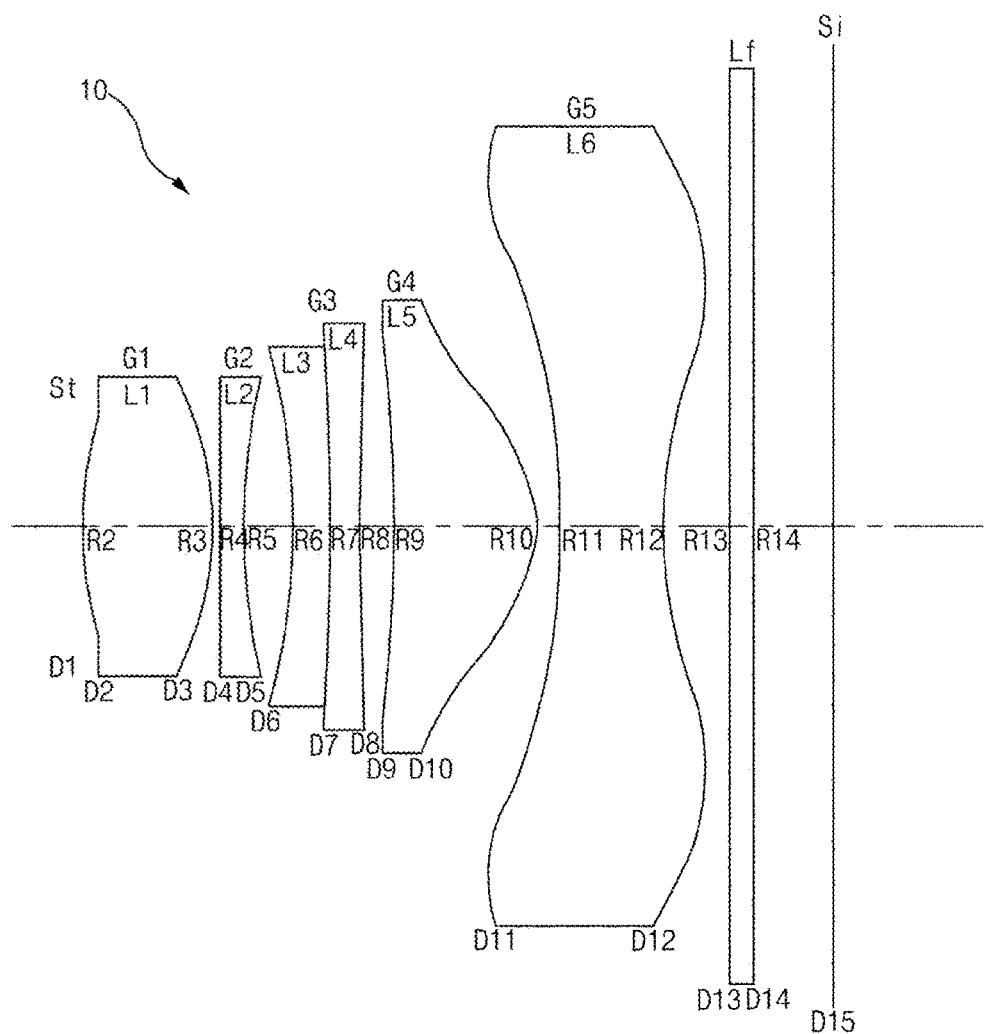
FIG. 1 is the structural diagram of a camera lens system in accordance with an exemplary embodiment of the present invention.

Description of the reference numbers in the drawings;

| | |
|---|---|
| G1: The first lens group | G2: The second lens group |
| G3: The third lens group | G4: The fourth lens group |
| G5: The fifth lens group | |
| L1: The first lens | L2: The second lens |
| L3: The third lens | L4: The fourth lens |
| L5: The fifth lens | L6: The sixth lens |

R2, R3, . . . : The curvature radius of the aperture, lens and optical filter.

D1, D2, . . . : Distance from the aperture, lens and optical filter; the center thickness of the aperture, lens and optical filter.

DETAILED DESCRIPTION OF THE EXEMPLARY EMBODIMENT

The present invention will hereinafter be described in detail with reference to an exemplary embodiment. It should be understood the specific embodiment described hereby is only to explain this disclosure, not intended to limit this disclosure.

Figure 2:
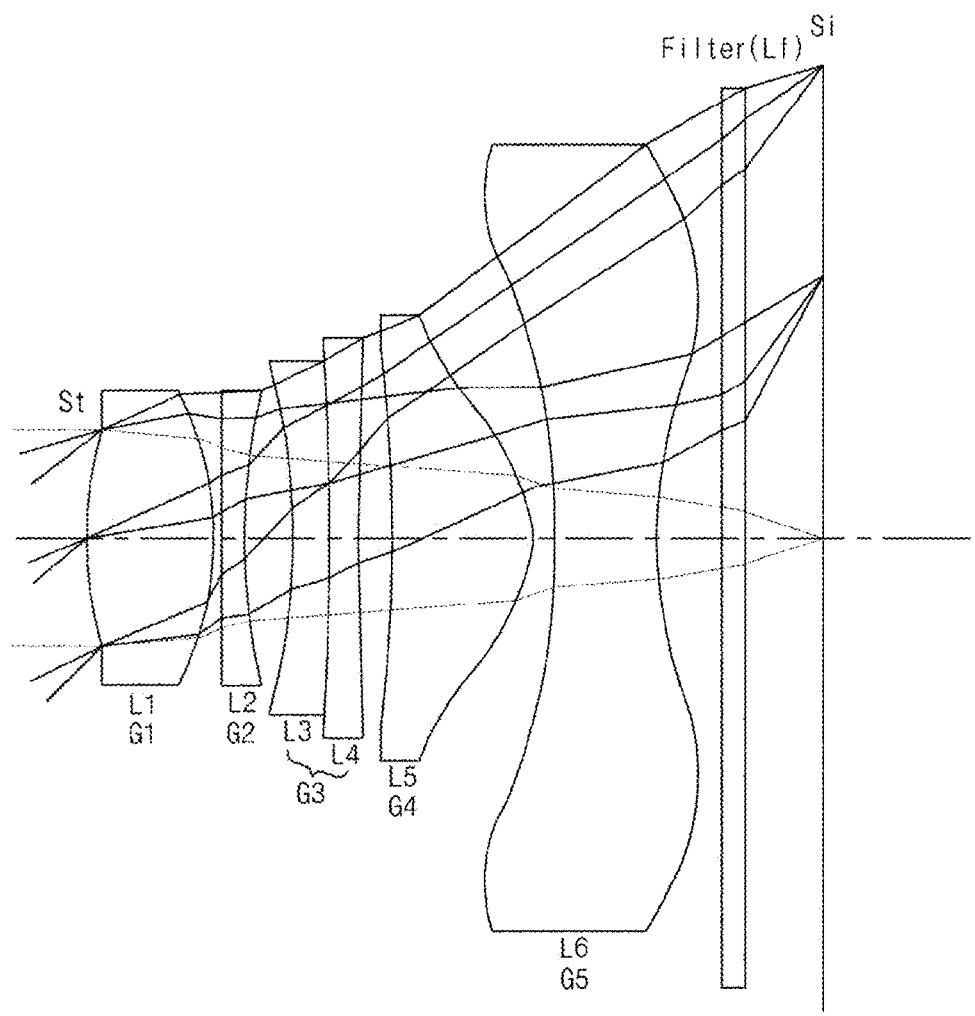
FIG. 2 is the light ray structural diagram of the camera lens system shown in FIG. 1.

Referring to the figures, the present invention provides a camera lens system. The camera lens system 10 shown in FIGS. 1-2 is an exemplary embodiment of the present invention. The camera lens system 10 includes 5 lens groups lined up from the object side to the image side surface: an aperture St, a first lens group G1, a second lens group G2, a third lens group G3, a fourth lens group G4 and a fifth lens group G5. An optical filter Lf and other optical materials are contained between the fifth lens group G5 and the image side surface Si.

The first lens group G1 includes a first lens L1. The second lens group G2 includes a second lens L2. The third lens group G3 includes a third lens L3 and a fourth lens L4. The fourth lens group G4 includes a fifth lens L5. The fifth lens group G5 includes a sixth lens L6.

The first lens L1 has a positive refractive power and its object side surface is outwardly convex. In this embodiment, the first lens L1 is a biconvex lens.

The second lens L2 has a negative refractive power. The object side surface is outwardly convex and the image side surface is inwardly concave.

The third lens L3 has a positive refractive power. The object side surface of the third lens L3 is convex and the image side surface is convex.

The fourth lens L4 has a negative refractive power. The image side surface of the third lens L3 is connected to the object side surface of the fourth lens L4. The object side surface of the fourth lens L4 is concave and the image side surface is concave.

In this embodiment, a contact surface between the third lens L3 and the fourth lens L4 is sphere, i.e. the third lens and the fourth lens are connected by a spherical face. It is easier to produce and process the lens and can also reduce the spherical aberration, astigmatism and distortion aberration.

According to the present invention, the first lens L1 is a biconvex lens. Therefore, the first lens is easy to process. At the same time, the second lens L2 has a negative refractive power and can reduce the light length. The principal light to the peripheral areas can be gathered and enhanced. In addition, the contact surface between the third lens L3 and the fourth lens L4 is a spherical face, thereby reducing the difficult degree in precision machining.

The image side surface of the fifth lens L5 is convex and has a positive refractive power. In this embodiment, the object side surface of the fifth lens L5 is outwardly convex.

The sixth lens L6 has a negative refractive power. The image side surface of the sixth lens L6 is concave and the object side surface is concave.

In particular, the image side surface of the sixth lens L6 has inflection point. The image side surface of the sixth lens L6 is concave at the area close to the optical axis and is convex at the area far away the optical axis. Thus the incident angle of principal light to the image side surface is reduced, thereby reducing spherical aberration and astigmatism, and improving the resolution of the lens.

The object side surface of the sixth lens L6 has also inflection point, i.e. the object side surface of the sixth lens L6 is concave at the area close to the optical axis and is convex at the area far away the optical axis.

The aperture St and the object side surface of the first lens L1 are located at the same position. It not only reduces total length of the camera lens system, but also reduces the external diameter of the lens, realizing the small size purpose.

In this embodiment, the image side surface of the first lens L1 is outwardly convex and the object side surface of the second lens L2 is inwardly concave. The image side surface of the third lens L3 is convex and the object side surface of the fourth lens L4 is concave. The interaction of adjacent convex and concave lenses can reduce the entire length of the camera lens system.

Specifically, f is the effective focal length of all lenses and f23 is the synthetic effective focal length of the second lens group G2 and the third lens group G3, thereby satisfying the following condition (1):

$$-5.0 < f23/f < 0 \quad (1)$$

The condition (1) above influences maximally the image astigmatism and keeps the optical total length minimal. When f23/f is smaller than 0, the incident light of all wavelength toward the image side surface is substantially away the focal position, and astigmatism occurs, as a result, the image quality is reduced. When f23/f is more than 0, the refractive index of the incident light is reduced, and the distance from the object side surface of the first lens group G1 to the image side surface becomes longer, it is difficult to gather light.

Further, the first lens satisfies the following condition (2):

$$0.80 < TTL/2y < 0.95 \quad (2)$$

Here, TTL is the distance from the object side surface to the image side surface of the first lens and y is the height of the maximal image on the image side surface, i.e. half of the length of diagonal line on the image surface sensor, so 2y is the length of the diagonal line of the image side surface sensor.

When TTL/2y is more than 0.95, total optical length increases. The optical system cannot be reduced. In addition, when TTL/2y is smaller than 0.80, the refractive index of the lens will be too large, it is not easy to correct the astigmatism of the second lens group and the third lens group, and therefore cannot get a high-performance camera lens system.

The third lens L3 and the fourth lens L4 form the third lens group G3. The third lens L3 has positive refractive power and the fourth lens L4 has negative refractive power. Therefore, the chromatic aberration of the third lens L3 is corrected by the fourth lens L4 which has negative refractive power.

In this embodiment, Vd_L3 represents Abbe number of the third lens and Vd_L4 represents Abbe number of the fourth lens. In this case, the third lens and the fourth lens satisfy the following condition (3):

$$20 < Vd\_L4 - Vd\_L3 < 40 \quad (3)$$

In the condition (3) above, if Vd_L4−Vd_L3 are lower than 20, the focal length increases and the field-depth becomes small. The image curvature and chromatic astigmatism become larger. If Vd_L4−Vd_L3 is more than 40, the spherical astigmatism and chromatic astigmatism become large, the optical total length increases also.

Further, the second lens L2 and the third lens L3 satisfy the following condition (4) and condition (5):

$$20 < Vd\_L3 < 30 \quad (4)$$

$$50 < Vd\_L4 < 60 \quad (5)$$

Accordingly, the contrast difference shall be reduced, so the color spots are reduced.

The definition of the aspherical surface derived from the example of the present invention is as follows.

According to the lens of the present invention, the aspherical surface takes the optical axis direction as z-axis, the direction perpendicular to the optical axis as h axis, and the advancing direction of the light as the positive direction, so the following formula 1 is derived. In which, z represents the distance from the center optical axis to the vertical plane of aspherical vertex of aspheric coordinate point in the height of R. a1 is the conic constant and c is the reciprocal of the curvature radius of the lens vertex. a4, a6, a8, a10, a12, a14, a16 represent aspherical coefficients.

$$Z = \frac{CR^2}{(1 + \sqrt{1-(a1+1)C^2R^2})} + a4r^4 + a6r^6 + a8r^8 + a10r^{10} + a12r^{12} + a14r^{14} + a16r^{16} \ldots \quad [\text{Formula 1}]$$

$$R = \sqrt{X^2 + Y^2}, \; C = 1/\text{radius}$$

The following illustrates the design data of the camera lens system according to the present invention. Table 1 shows the data of the camera lens system 10 shown in FIG. 1. Table 2 shows the aspherical data. Table 1 shows the curvature radius in FIG. 1 as R2, R3, . . . ; The thickness or distance shown in FIG. 1 is D1, D2, . . . . Since the aperture and the object side surface of the lens are located at the same position, the distance D1 between the aperture and the object side surface of the first lens 1 is taken as 0 in table 1.

TABLE 1

| Example 1 | | The radius of curvature | Thickness | nd | vd |
|---|---|---|---|---|---|
| object | Sphere | Infinity | Infinity | | |
| 1 | Sphere | Infinity | 0.00000 | | |
| 2 | Asphere | 2.63110 | 1.17800 | 1.5350 | 56.0000 |
| 3 | Asphere | −6.90326 | 0.10964 | | |
| 4 | Asphere | 34.99065 | 0.33645 | 1.6355 | 23.9000 |
| 5 | Asphere | 3.63086 | 0.40936 | | |
| 6 | Asphere | 1874.94728 | 0.52973 | 1.6410 | 22.4000 |
| 7 | Sphere | −43.44204 | 0.51360 | 1.5350 | 56.0000 |
| 8 | Asphere | 6.82184 | 0.18912 | | |
| 9 | Asphere | 24.93245 | 1.22190 | 1.5311 | 55.7000 |
| 10 | Asphere | −1.23506 | 0.12472 | | |
| 11 | Asphere | −16.38877 | 0.68069 | 1.5311 | 55.7000 |
| 12 | Asphere | 1.27514 | 0.53711 | | |
| 13 | Sphere | Infinity | 0.21000 | 1.5167 | 64.2000 |
| 14 | Sphere | Infinity | 0.93967 | | |
| image | Sphere | Infinity | 0.00000 | | |

TABLE

| | Aspheric coefficient | | | | | | |
|---|---|---|---|---|---|---|---|
| | Conic constant (k) | 4 times factor (A) | 6 times factor (B) | 8 times factor (C) | 10 times factor (D) | 12 times factor (E) | 14 factor (F) |
| 2 | −1.868443E+00 | 7.341124E−03 | −1.585812E−03 | −1.576121E−03 | 3.575346E−04 | −4.428032E−04 | 0.000000E+00 |
| 3 | −1.148948E+01 | 1.182757E−02 | −3.421934E−02 | 1.365419E−02 | −3.7557G8E−03 | 3.727034E−04 | 0.000000E+00 |

TABLE-continued

Aspheric coefficient

| | Conic constant (k) | 4 times factor (A) | 6 times factor (B) | 8 times factor (C) | 10 times factor (D) | 12 times factor (E) | 14 factor (F) |
|---|---|---|---|---|---|---|---|
| 4 | −3.000000E+02 | 1.116211E−02 | −2.402887E−02 | 8.424336E−03 | −7.982841E−04 | 1.487648E−04 | 0.000000E+00 |
| 6 | −2.349287E+01 | 4.297803E−02 | −2.362055E−02 | 1.004673E−02 | −1.588893E−03 | 2.131244E−04 | 0.000000E+00 |
| 7 | 1.737030E+06 | −3.196582E−02 | 3.035265E−03 | 7.922524E−03 | −9.002978E−03 | 4.095363E−03 | −6.451810E−04 |
| 8 | −2.466167E+02 | −9.754903E−03 | 5.575318E−05 | −2.644260E−04 | −3.787555E−05 | 1.3830606−05 | 1.191041E−05 |
| 9 | −1.629865E+04 | −3.604748E−02 | 3.264748E−02 | −1.576299E−02 | 3.870090E−03 | −4.719942E−04 | 1.772396E−05 |
| 10 | −4.018201E+00 | −2.028819E−02 | 4.841431E−03 | 9.304465E−04 | −3.577614E−04 | 5.208556E−05 | −4.874324E−06 |
| 11 | −9.486423E+02 | −3.720525E−02 | 2.384817E−03 | 4.236311E−04 | −3.232133E−05 | −1.709920E−06 | 1.516215E−07 |
| 12 | −5.915792E+00 | −2.999400E−02 | 6.494257E−03 | −1.189164E−03 | 1.385557E−04 | −9.159728E−06 | 2.537665E−07 |

Figure 3:
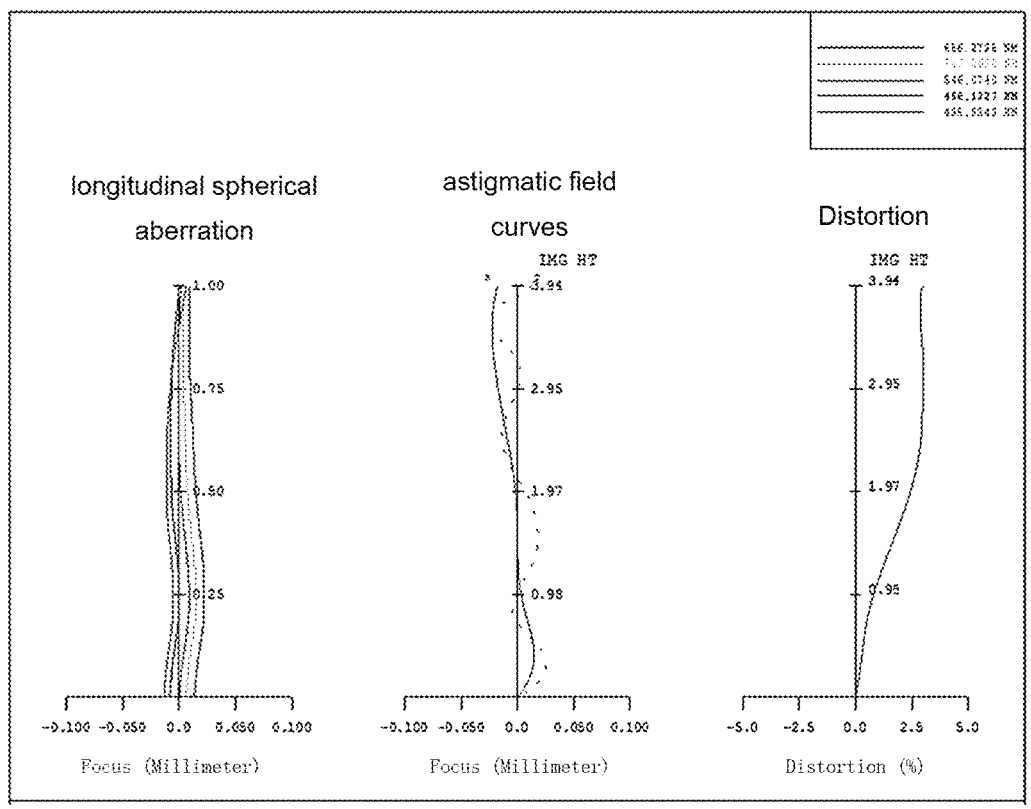
FIG. 3 is the longitudinal spherical aberration, astigmatic field curves and distortion of the camera lens system shown in FIG. 1.

FIG. 3 is the schematic diagram of the longitudinal spherical aberration, astigmatism field curve and distortion of middle and small camera lens system 10 shown in FIG. 1.

The longitudinal spherical aberration diagram shows the light with wavelength of about 65 nm, 587 nm, 486 nm and 435 nm. The astigmatism field curve and distortion indicate the light with the wavelength of 546 nm.

Table 3 below lists the values of all conditions in this embodiment. Obviously, the camera lens system of this embodiment satisfies the following conditions.

TABLE 3

| Conditions | Example |
|---|---|
| 0.80 < TTL/2y < 0.95 | 0.889 |
| 20 < Vd_L3 < 30 | 22.4 |
| 50 < Vd_L4 < 60 | 56.0 |

Figure 4:
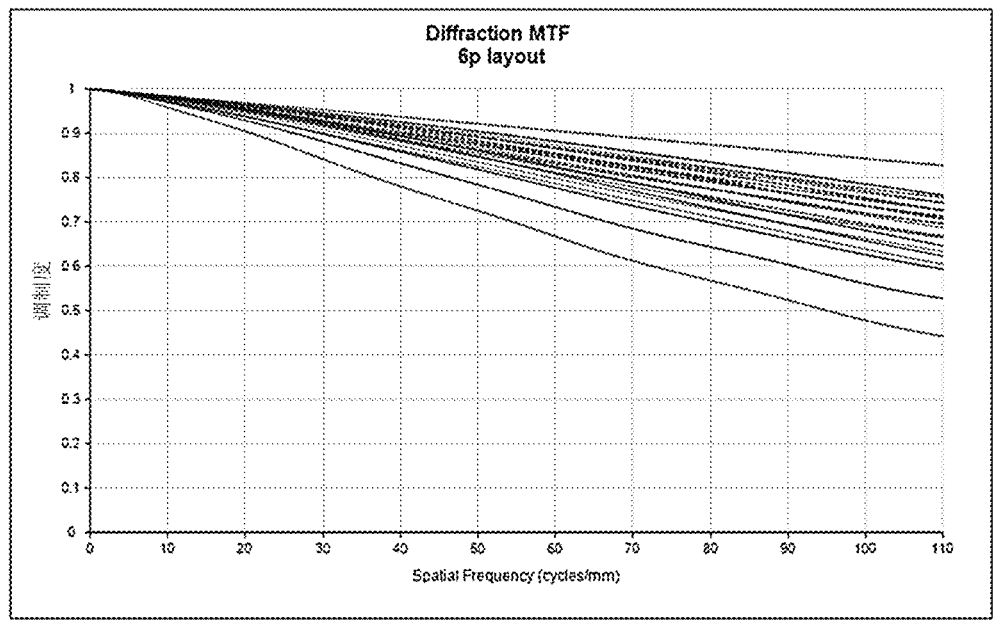
FIG. 4 is MTF curve diagram of the camera lens system shown in FIG. 1.

FIG. 4 shows the schematic diagram of MTF resolving power of the camera lens system shown in FIG. 1. In FIG. 4, X-axis represents the spatial frequency and Y-axis represents the modulation.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera lens system comprising five lens groups lined up from the object side, the lens groups including:
a first lens group comprising a first lens having a positive refractive power;
a second lens group comprising a second lens having a negative refractive power;
a third lens group comprising a third lens having a positive refractive power and a fourth lens having a negative refractive power, an image side surface of the third lens being cemented to an object side surface of the fourth lens;
a fourth lens group comprising a fifth lens having a convex image side surface and a positive refractive power;
a fifth lens group comprising a sixth lens having a concave image side surface and a negative refractive power;
the third lens and the fourth lens satisfying the following condition:

20<Vd_L4−Vd_L3<40 where, Vd_L3 is Abbe number of the third lens and Vd_L4 is Abbe number of the fourth lens.

2. The camera lens system according to claim 1 satisfying the following condition:

−5.0<f23/f<0 where,
f is the effective focal length of the entire lenses;
f23 is the synthetic effective focal length of the second lens group and the third lens group.

3. The camera lens system according to claim 1 satisfying the following condition:

0.80<TTL/2y<0.95 where
TTL is the distance from the object side surface of the first lens to the image side surface of the camera lens system;
y is half of the diagonal line length of the image side surface of the camera lens system.

4. The camera lens system according to claim 1, wherein the third lens and the fourth lens satisfy following condition:

20<Vd_L3<30

50<Vd_L4<60 where, Vd_L3 is Abbe number of the third lens and Vd_L4 is Abbe number of the fourth lens.

5. The camera lens system according to claim 1, wherein a cementing surface of the third lens and the fourth lens is spherical.

* * * * *